United States Patent Office 3,433,067
Patented Mar. 18, 1969

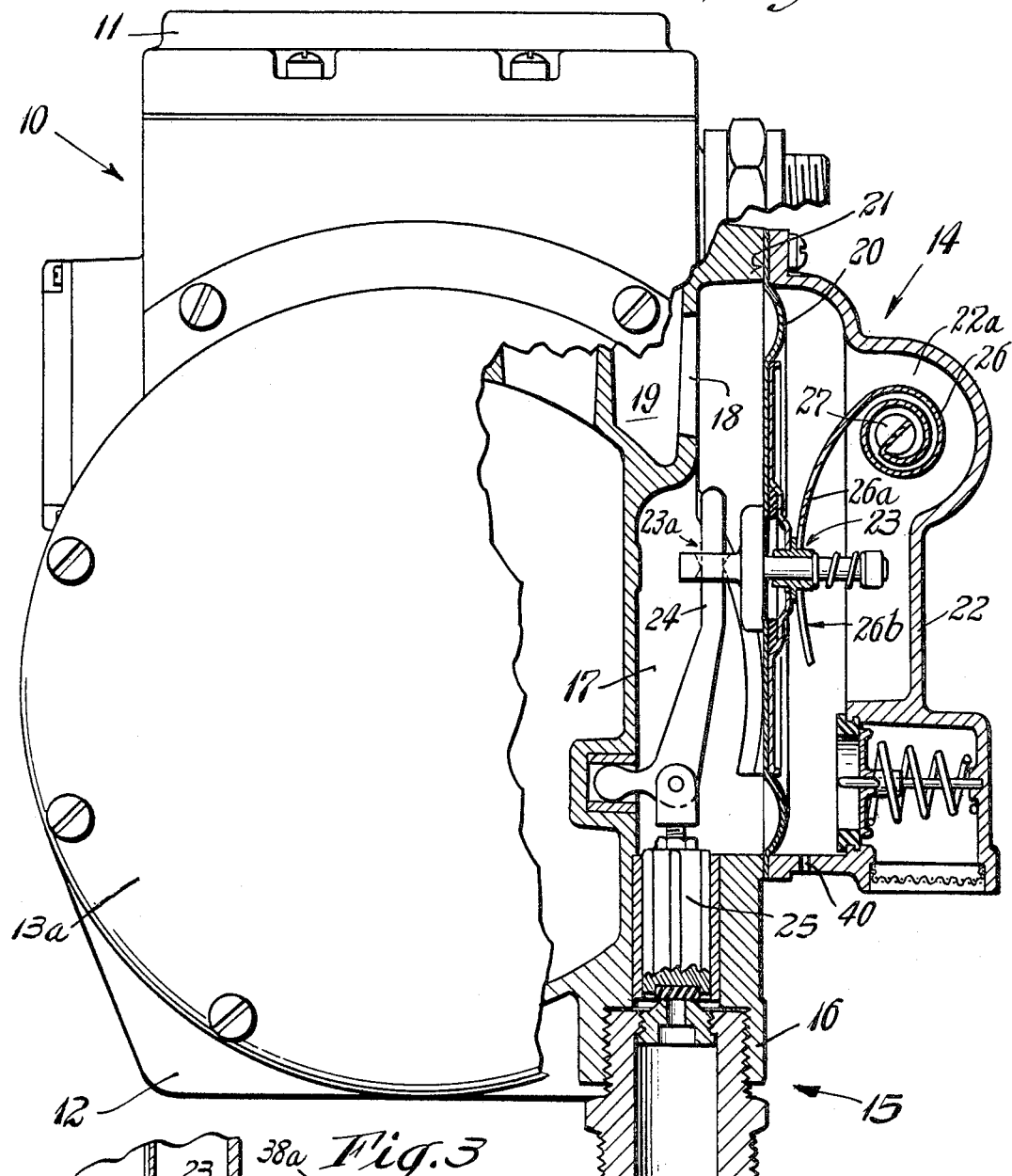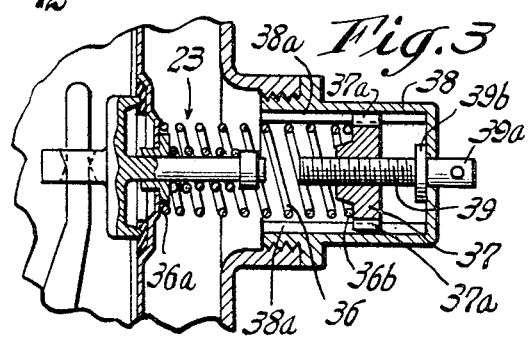

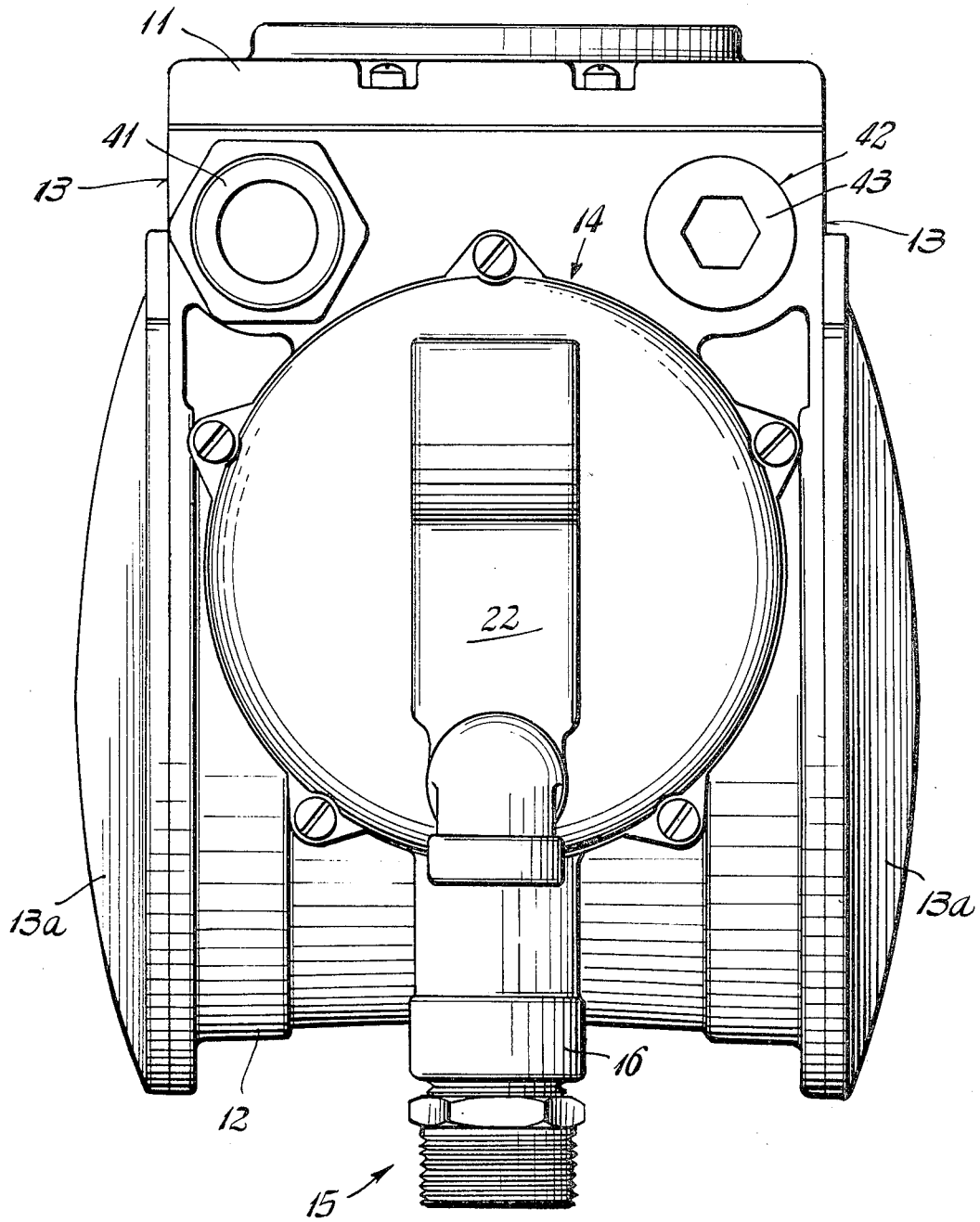

3,433,067
METER AND SIDE-MOUNTED REGULATOR COMBINATION
Theodore A. St. Clair, Fairfield, Conn., assignor to Textron, Inc., Providence, R.I., a corporation of Rhode Island
Filed Mar. 22, 1967, Ser. No. 625,118
U.S. Cl. 73—199                                5 Claims
Int. Cl. G01f 1/02

ABSTRACT OF THE DISCLOSURE

The combination gas meter and regulator has a downwardly facing inlet in the bottom of the meter and the regulator mounted in the side of the meter adjacent the inlet, said regulator having a large, vertically disposed pressure-responsive diaphragm for controlling a valve in the inlet. The vertically disposed diaphragm sheds condensate and is normally urged to a predetermined position by spring means.

---

Heretofore it has been the practice to place the pressure regulator for the gas meter on the top of the meter casing and dispose it between the upwardly facing inlet and outlet bosses thereon, for example, as shown in Patent No. 2,274,697. This arrangement had several disadvantages, one of which was the restriction in the size of the diaphragm that could be used in the regulator.

The present invention overcomes this disadvantage by locating the pressure regulator on the side of the meter casing, preferably the side between the opposed chamber covers of the meter casing, so as to form a part of a side wall of the meter casing and with a cover portion for the regulator secured to said side of the casing. This location of the regulator on the meter enables a much larger regulator to be used without increasing the size of the meter. This enables the use of a relatively large diaphragm in the regulator which larger diaphragm is more sensitive as it controls a valve in the inlet passage extending from the downwardly facing inlet adjacent the bottom of the meter and extending upwardly to the usual valving mechanism adjacent the top of the meter.

The diaphragm will be disposed in a vertical position and any condensate as might be formed thereon will readily drain therefrom and be collected by the cover for the regulator and be vented therefrom.

The downwardly facing inlet, according to the present invention, is an advantage over the inlets heretofore used in that it prevents the formation of ice and hydrates at low temperatures that interfered with the operation of the valve.

The present invention also provides for greater accessibility of the outlet port and proving port for the combination.

Other features and advantages of the invention will be apparent from the specification and claims when considered in connection with the accompanying drawings in which:

FIGURE 1 is a side view, partly in section, of the present invention.

FIG. 2 is a view taken from the right in FIG. 1.

FIG. 3 is a sectional view showing a modification of the invention.

As shown in the drawings, the present invention comprises a gas meter having a casing 10 provided with a top 11, bottom 12, and sides 13, two of which are formed by oppositely disposed covers 13a for the usual end chambers of the meter. Disposed on a side of the casing between covers 13a, is a pressure responsive regulator 14 which is secured to and forms a part of the casing as shown in FIG. 2. This location enables a larger regulator to be used without increasing the size of the meter.

The inlet 15 for the meter comprises a downwardly facing boss 16 located at the bottom of the meter adjacent the regulator and communicating with an inlet passage 17 extending therefrom to the inlet port 18 for the usual valve chamber 19.

In its position on the side of the meter, the larger regulator has a flexible diaphragm 20 which is much larger than that heretofore used which provides a greater sensitivity and more accurate regulation. The diaphragm is disposed over an opening 21 in the side of the casing communicating with the inlet passage and is clamped in position thereover by a regulator cover 22 as shown in FIG. 1.

The diaphragm has a center post means 23 which is secured thereto to move therewith and which is connected by the usual connection 23a to a pivoted valve operating lever 24 for operating a valve 25 in the inlet passage adjacent the inlet 15 for controlling the flow of gas from inlet 15 to the meter in response to pressure in said inlet passage.

The diaphragm is urged to a normal operating position by resilient means and is movable from that position in response to increased or decreased pressure in the inlet passage to control the valve 25.

In the form of the invention shown in FIG. 1 the resilient means comprises a spiral spring 26 having one end fixed in an adjusting stud 27 rotatably mounted on the portion 22a of the cover 22 in offset relation to said center post means 23. The other end of the spring is formed into an elongate tail 26a extending over the diaphragm and having a slotted end 26b engaging and straddling the center post means in all adjusted positions of the spring to apply the required yielding pressure to the diaphragm during the movements thereof.

In the form of the invention shown in FIG. 3 the resilient means comprises a helical spring 36 axially disposed with respect to said center post means 23 and having one end 36a engaging the center post means and the other end 36b engaging an adjusting nut 37 slidably mounted in a hub 38 threadedly secured to the cover. A feed screw 39 is rotatably mounted in the hub with one end projecting through the end of the hub and is provided with a tool-engaging portion 39a whereby it can be readily turned. A collar 39b engages the inner surface of the hub and is held in position by the pressure of the spring against the nut 37 which is threaded on the feed screw. The nut is held against rotation with the screw by means of wings 37a slidable in grooves 38a on the hub. By rotating the feed screw the nut is fed toward or away from the diaphragm and the tension on the spring will be regulated to control the action of the diaphragm in response to the pressure in the inlet passage.

With the regulator mounted on the side of the meter, as shown in FIG. 1, the diaphragm will be located in a vertical position so that any atmospheric condensate which might form thereon will run off and be collected in the cover and be vented through vent 40. Also with the regulator in this position the downwardly facing inlet 15 can be used with substantial advantage in that it prevents hydrates and moisture which freeze in cold weather from collecting on the valve and preventing, or interfering with, the operation of the valve.

Also, as shown in FIG. 2, the mounting of the regulator on the side of the meter provides ample space above the regulator, for locating a meter outlet port 41 and a proving port 42, which communicates with the inlet passage and is normally closed by a plug 43, in a readily accessible position so that the regulator can be easily bypassed during the proving of the meter and the outlet connections to the meter can be greatly facilitated.

Since the regulator is actually built into and forms a part of the meter casing many economies in manufacture are achieved.

Variations and modifications may be made within the scope of the claims and portions of the improvements may be used without others.

I claim:

1. In a combination gas meter and regulator, a meter casing having a top, bottom and sides, a downwardly facing inlet adjacent the bottom of the meter and communicating with an inlet passage in the meter, a pressure regulator having a valve with a valve port and a cooperating valving element movable relative thereto, said valve being located within the downwardly facing inlet, and communicating therewith, for controlling the flow of gas to said meter through said inlet passage, said regulator forming a part of a side of said meter casing and having a cover secured to said casing and including a large, vertically disposed flexible, pressure-responsive diaphragm, means connecting said diaphragm to said valving element to control the valve in response to movement of the diaphragm, and means urging the diaphragm to a predetermined position.

2. The invention as defined in claim 1 wherein the valve is located above the downwardly facing inlet which provides means for preventing hydrates and moisture which freeze at low temperature from collecting on the valve and causing malfunctioning of the valve.

3. The invention as defined in claim 1 wherein the side of the meter above said regulator is provided with an outlet port and a normally closed proving port which are readily accessible.

4. The invention as defined in claim 1 wherein the last means comprises a spiral spring having one end mounted on an adjusting stud positioned on the cover laterally of the center of the diaphragm and the other end forming an elongate tail extending over and engaging the center of the diaphragm throughout a substantial adjustment of said spring.

5. The invention as defined in claim 1 wherein the last means comprises a helical spring axially aligned with a center post means of the diaphragm with one end in engagement therewith, a hub secured to said cover and enclosing the other end of said spring, an adjusting nut engaging the other end of said spring and mounted within said hub for solely sliding movement, and a feed screw for said nut within the hub and having an actuating portion projecting from said hub to receive a tool for rotating the screw and adjusting the position of the nut to vary the tension in said spring to alter the action of said regulator.

References Cited

FOREIGN PATENTS 326,925    3/1930    Great Britain.
1,071,963    12/1959    Austria.

JAMES J. GILL, *Primary Examiner.*

R. S. SALZMAN, *Assistant Examiner.*

U.S. Cl. X.R.

330—17, 18, 19, 20, 25